UNITED STATES PATENT OFFICE.

WILLIAM P. WISE, OF BRISTOL, INDIANA, ASSIGNOR OF TWO-THIRDS TO CHRISTIAN N. KAUTZ AND LYMAN B. LANGWORTHY, OF SAME PLACE.

COMPOSITION SLATING FOR BLACKBOARDS, &c.

SPECIFICATION forming part of Letters Patent No. 314,636, dated March 31, 1885.

Application filed April 10, 1884. (No specimens.)

*To all whom it may concern:*

Be it known that I, WILLIAM P. WISE, a citizen of the United States, residing at Bristol, in the county of Elkhart and State of Indiana, have invented certain new and useful Improvements in Composition Slating, of which the following is a specification, to wit:

The object of my invention is to provide a new composition of slating to be used as surfacing for wall or black boards with which school-rooms are commonly furnished, and also adapted for the manufacture of hard slates and for other purposes; and to this end my invention consists of a combination of certain ingredients, as hereinafter specifically set forth.

I make my new composition of slating so that when completed it will be in color either black, blue, green, or chocolate, as may be desired, the base of the composition being the same for any one of the colors, but the ingredients for coloring being different for each color. The base of the composition without the coloring-matter consists of the following ingredients, in about the proportions named, as follows: alcohol, one gallon; shellac, two and one-half pounds; bone-black or ivory-black, ten ounces; drab, six ounces; charcoal, six ounces; emery-flour, eight ounces; pumice-flour, six ounces; benzine, six ounces; caoutchouc, four ounces. The ingredients enumerated are mixed thoroughly together, forming a paste, and are ready for the color-matter. I prefer to mix the coloring-matter first with the shellac and alcohol, and then add the other ingredients of the base.

To make a black slating I add to the foregoing ingredients, which I have called the "base," copperas, two ounces; logwood, two ounces; lamp-black, six ounces.

For blue slating I add to the base ultramarine-blue, ten ounces.

For green slating I add to the base ultramarine-blue, six ounces; chrome-yellow, five ounces.

For chocolate slating I add to the base ultramarine-blue, five ounces; Venetian red, five ounces.

The several ingredients are mixed thoroughly together, forming a paste, which is applied to the surface by means of a trowel or any suitable tool.

The composition will dry quickly, forming a smooth, hard surface, so that slate or talc may be employed on it, and a board furnished which is comparatively dustless.

It will be observed that I use no "paris-green" in making my green slating.

I do not wish to confine myself strictly to the foregoing proportions and quantities; but the same may be varied according to the nature and quality of the materials used and the consistency of the mixture required without departing from the spirit of my invention.

Having described my invention, what I claim as new, and desire to secure by Letters Patent, is—

The herein-described slating compound, composed of alcohol, shellac, bone-black, drab, charcoal, emery-flour, pumice-flour, benzine, and caoutchouc, substantially as described, and for the purpose set forth.

In testimony whereof I affix my signature in presence of two witnesses.

WILLIAM P. WISE.

Witnesses:
LYMAN B. LANGWORTHY,
C. N. KAUTZ.